US012620750B2

(12) United States Patent
Ohmura et al.

(10) Patent No.: US 12,620,750 B2
(45) Date of Patent: May 5, 2026

(54) CONNECTOR LOCK DEVICE

(71) Applicant: YAZAKI CORPORATION, Tokyo (JP)

(72) Inventors: Takenori Ohmura, Kakegawa (JP); Yoshitaka Tsushima, Kakegawa (JP); Seiji Kozono, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 383 days.

(21) Appl. No.: 18/340,826

(22) Filed: Jun. 23, 2023

(65) Prior Publication Data

US 2024/0022015 A1 Jan. 18, 2024

(30) Foreign Application Priority Data

Jul. 14, 2022 (JP) ................................ 2022-113334

(51) Int. Cl.
*H01R 13/516* (2006.01)

(52) U.S. Cl.
CPC .................................. *H01R 13/516* (2013.01)

(58) Field of Classification Search
CPC ................ H01R 13/516; H01R 13/506; H01R 13/6633; H01R 13/6397; H01R 13/639; H01R 13/533; H01R 2201/26; Y02T 10/70; Y02T 10/7072; Y02T 90/14; B60L 53/16
See application file for complete search history.

(56) References Cited

U.S. PATENT DOCUMENTS 8,025,526 B1 * 9/2011 Tormey .............. H01R 13/6397 439/372
8,712,648 B2 * 4/2014 Charnesky ............. H01R 43/26 439/304
2009/0286414 A1 11/2009 Ohtomo
2011/0207347 A1 * 8/2011 Tsuruta ................ H01R 31/065 439/133
2013/0078841 A1 * 3/2013 Ferguson ........... H01R 13/6397 439/350
2013/0309898 A1 * 11/2013 Mizuno ................... E05B 65/00 439/347
2013/0337669 A1 * 12/2013 Najera .................... B60L 53/16 70/174
2014/0187076 A1 * 7/2014 Fuhrer ................... H01R 13/62 439/345
2015/0011111 A1 * 1/2015 Toratani ........... H01R 13/62977 439/357
2015/0048791 A1 * 2/2015 Veiga ...................... B60L 53/14 320/109

(Continued)

FOREIGN PATENT DOCUMENTS

JP 2010-4731 A 1/2010
JP 2014-75299 A 4/2014

*Primary Examiner* — Truc T Nguyen
(74) *Attorney, Agent, or Firm* — KENEALY VAIDYA LLP

(57) ABSTRACT

A connector lock device includes: a charging connector that supplies power to a battery; an inlet to which the charging connector is fitted; and a locking member that is driven forward and backward by an actuator provided in a housing of the charging connector, and of which a tip portion is retracted into the housing at a retracted position and protrudes out of the housing at an advanced position to be locked to a locked portion of the inlet and prevent the charging connector from being separated from the inlet.

4 Claims, 13 Drawing Sheets

(56) References Cited

U.S. PATENT DOCUMENTS

| | | | | |
|---|---|---|---|---|
| 2015/0207261 | A1 | 7/2015 | Fukushima et al. | |
| 2016/0280086 | A1* | 9/2016 | Lopez | B60L 53/16 |
| 2017/0274786 | A1* | 9/2017 | Eisner | B60L 53/68 |
| 2019/0375300 | A1* | 12/2019 | Lyon | B60L 53/16 |

* cited by examiner

CONNECTOR LOCK DEVICE

CROSS-REFERENCE TO RELATED APPLICATION(S)

This application is based upon and claims the benefit of priority from prior Japanese patent application No. 2022-113334 filed on Jul. 14, 2022, the entire contents of which are incorporated herein by reference.

BACKGROUND

1. Field of the Invention

The present disclosure relates to a connector lock device that prevents a charging connector from coming off from an inlet.

2. Description of the Related Art

For example, an electric vehicle or a plug-in hybrid vehicle is charged by supplying commercial power to a battery installed in the vehicle by fitting a charging connector, which is connected via a cable to a power supply device installed in a home or a station, into an inlet installed in the vehicle. Therefore, the charging connector is provided with a locking mechanism capable of maintaining a state where the charging connector is fitted to the inlet and preventing mutual separation (see JP2014-75299A).

Such a locking mechanism includes a locking arm (locking member), a locking claw provided at a tip of the locking arm and engaged with a locking protrusion (locked portion) of the inlet, a lock operation portion provided at a rear end of the locking arm and allowing a worker to operate the locking arm, and a coil spring (biasing member) that biases the locking arm toward a locking position.

The locking arm is provided to be swingable about a swing fulcrum between a locking position where the locking claw engages with the locking protrusion of the inlet and a release position where the engagement between the locking protrusion and the locking claw is released. The locking mechanism is accommodated in a connector case of the charging connector, and the locking claw and the lock operation portion are exposed outside the connector case.

When the charging connector is fitted into the inlet, the locking claw of the locking arm engages with the locking protrusion of the inlet to prevent mutual separation. When releasing the engagement between the inlet and the charging connector, the charging connector can be pulled out from the inlet by pressing the lock operation portion and swinging the locking arm to the release position.

By the way, the above-described locking mechanism of the related art requires the locking arm to be swingably provided in the connector case, and it is necessary to consider a swing space. Therefore, a height dimension of the charging connector tends to be large.

The locking claw and the lock operation portion of the locking arm as the locking member are exposed to the outside of the connector case. Therefore, there is a possibility that the locking arm may be damaged by a direct impact such as when the charging connector is dropped. The locking arm is always biased toward the locking position by the coil spring, and when the charging connector is attached to or detached from the inlet, the locking claw repeatedly comes into sliding contact with an outer surface of the inlet or the locking protrusion. Here, there is a possibility that the locking claw and the locking protrusion are worn. Therefore, there is a concern that the charging connector may easily come off from the inlet due to damage such as breakage or wear of the locking arm.

SUMMARY

The present disclosure is made in view of the circumstances described above, and an object thereof is to provide a compact connector lock device that can prevent a locking member from being damaged and reliably prevent a charging connector from coming off from an inlet.

According to an aspect of the present disclosure, there is provided a connector lock device including: a charging connector that supplies power to a battery; an inlet to which the charging connector is fitted; and a locking member that is driven forward and backward by an actuator provided in a housing of the charging connector, and of which a tip portion is retracted into the housing at a retracted position and protrudes out of the housing at an advanced position to be locked to a locked portion of the inlet and prevent the charging connector from being separated from the inlet.

According to the present disclosure, it is possible to provide a compact connector lock device that can prevent a locking member from being damaged and reliably prevent a charging connector from coming off an inlet.

The present disclosure is briefly described above. Details of the present disclosure will be further clarified by reading the following description of embodiments (hereinafter referred to as "embodiment") with reference to the accompanying drawings.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

Hereinafter, an example of an embodiment according to the present disclosure will be described with reference to the drawings.

Figure 1:
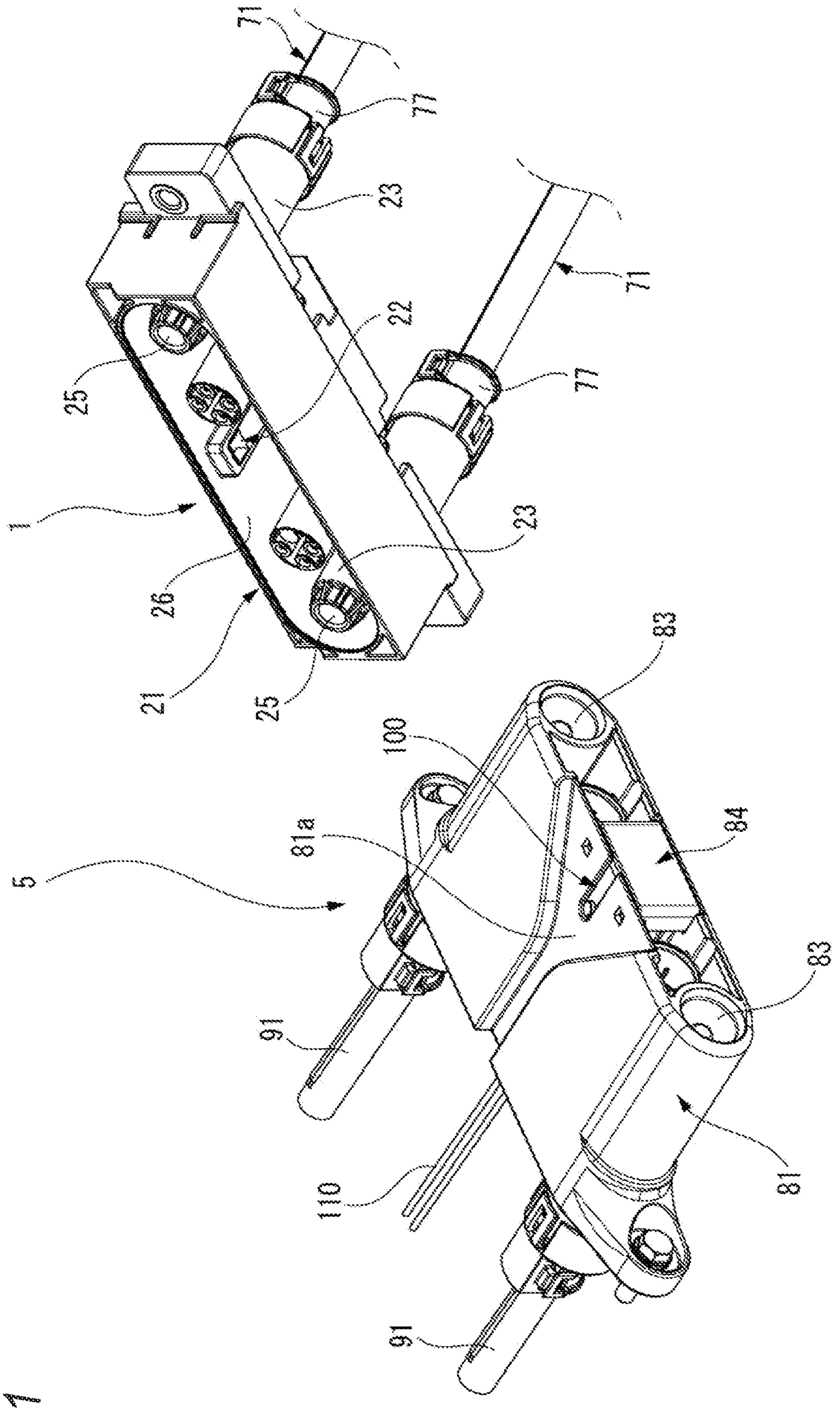
FIG. 1 is a perspective view illustrating a charging connector and an inlet provided with a connector lock device according to an embodiment of the present disclosure.
Figure 2:
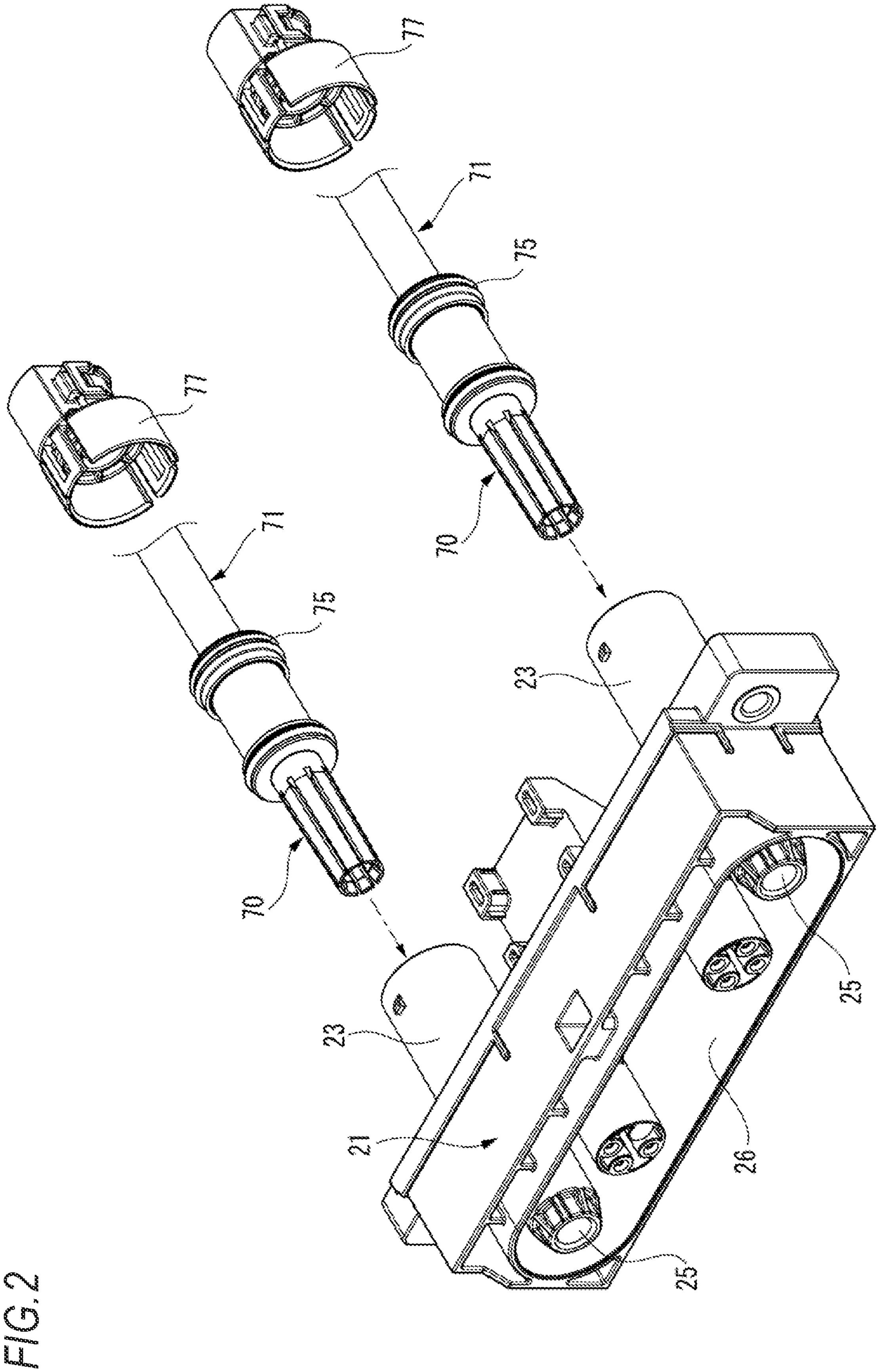
FIG. 2 is an exploded perspective view of the inlet illustrated in FIG. 1.
Figure 3:
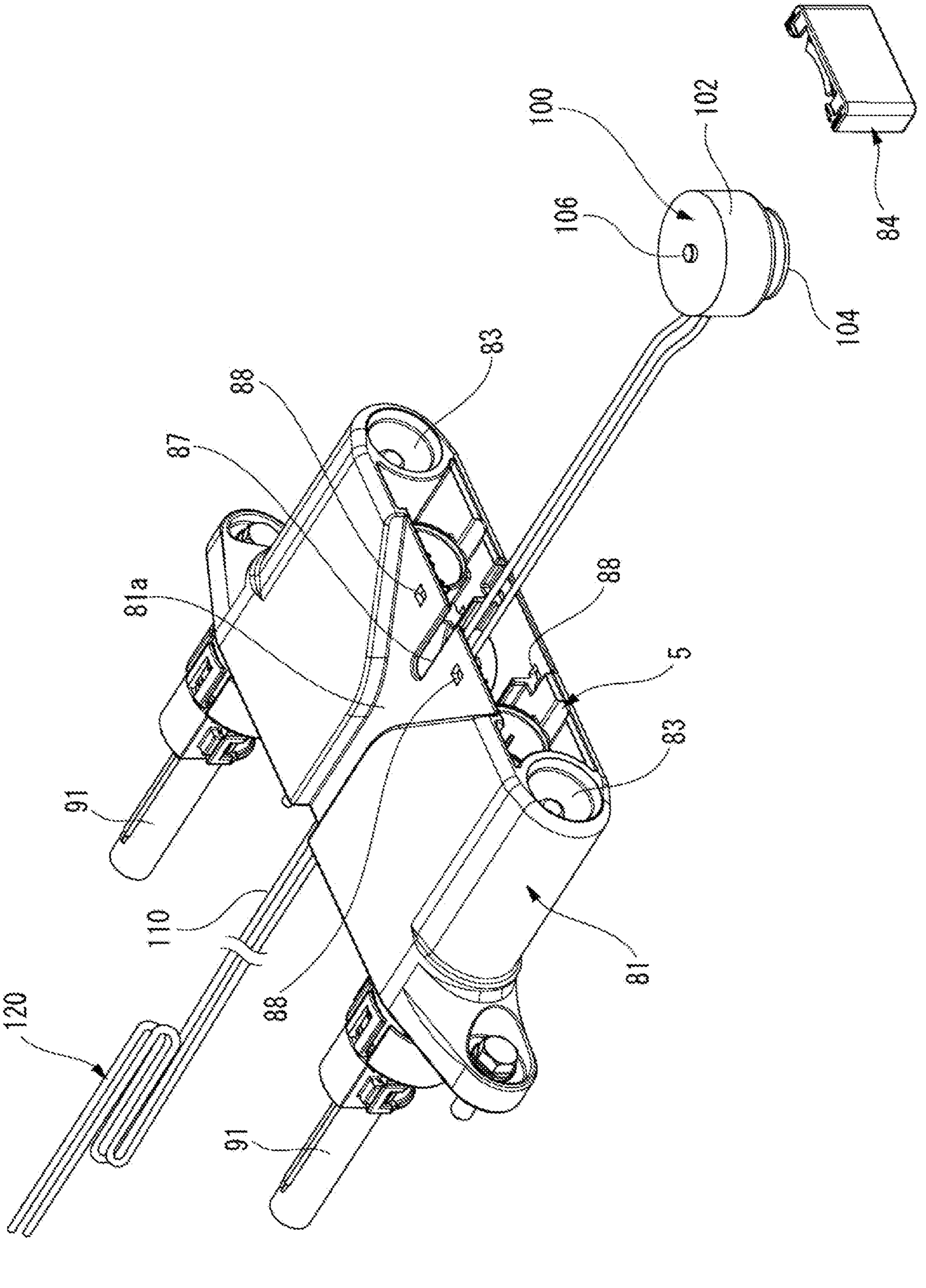
FIG. 3 is an exploded perspective view of the charging connector illustrated in FIG. 1.

FIG. 1 is a perspective view illustrating an inlet 1 and a charging connector 5 provided with a connector lock device according to one embodiment of the present disclosure. FIG. 2 is an exploded perspective view of the inlet 1 illustrated in FIG. 1. FIG. 3 is an exploded perspective view of the charging connector 5 illustrated in FIG. 1.

As illustrated in FIGS. 1 and 2, the inlet 1 according to the embodiment includes a housing 21 that accommodates a connection terminal 70, a locked portion 22 that locks a lock shaft 106 that is a locking member of the charging connector 5 to lock the charging connector from being separated from the inlet 1.

In the specification, a front-rear direction is a direction along a connector fitting direction (left-right direction in FIG. 7) of the housing 21, and a side to which a plug housing 81 of the charging connector 5 is fitted is set as a front side of the housing 21. An up-down direction is a direction (up-down direction in FIG. 7) orthogonal to the connector fitting direction of the housing 21, and a top plate side of the housing 21 is set as an upper side.

Figure 6:
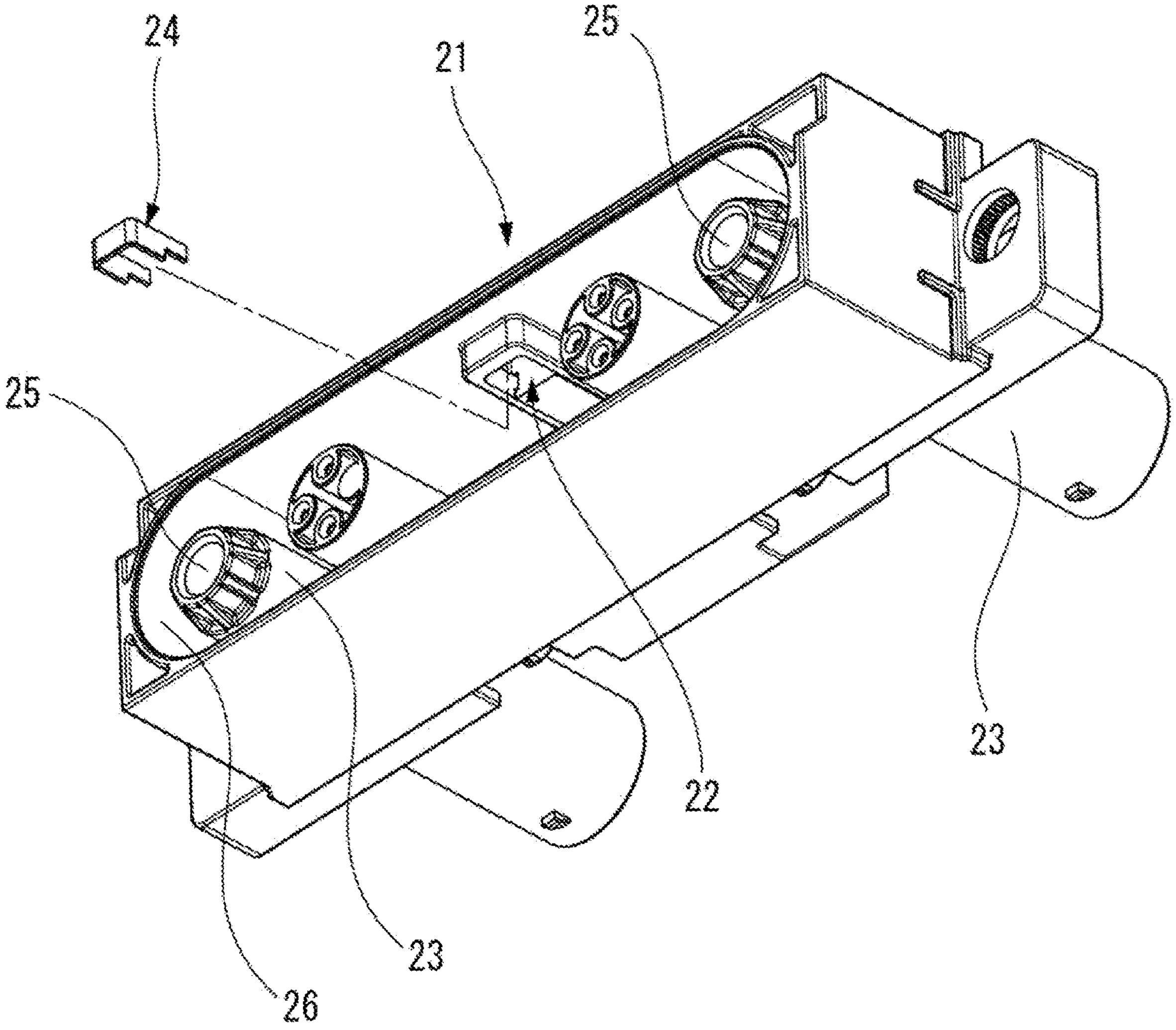
FIG. 6 is a perspective view for illustrating a locked portion of the inlet illustrated in FIG. 2.

As illustrated in FIGS. 2 and 6, the housing 21 of the inlet 1 is formed in a flat rectangular parallelepiped shape from electrically insulating synthetic resin. The housing 21 includes a pair of terminal accommodation cylindrical portions 23 and 23 that are formed integrally with a rear wall 28 (see FIG. 9) and protrude toward the charging connector 5 side. The terminal accommodation cylindrical portions 23 and 23 are disposed in an opening 26 having a cylindrical shape and a flat oval cross section.

The connection terminal 70 connected to an end portion of a high-voltage cable 71 is accommodated in the terminal accommodation cylindrical portion 23. The connection terminal 70 is a female terminal made of a conductive metal material, and is composed of a plurality of flexible pieces arranged in a cylindrical shape. A front opening 25 into which a mating connection terminal 90 of the charging connector 5 is inserted is formed at a front end of the terminal housing cylindrical portion 23. The high-voltage cable 71 connected to a rear end portion of the connection terminal 70 is pulled out from a rear end opening of the terminal accommodation cylindrical portion 23.

A sealing member 75 is attached to the high-voltage cable 71 pulled out from the rear end opening of the terminal accommodation cylinder portion 23 to seal the terminal housing cylinder portion 23 in a liquid-tight manner. Separation of the sealing member 75 is regulated by a rear holder 77 attached to a rear end of the terminal accommodation cylindrical portion 23.

As illustrated in FIG. 1, on an inner surface of an upper wall of an opening portion 26 having a cylindrical shape in the housing 21, there is provided the locked portion 22 that locks the lock shaft 106 of the charging connector 5 to lock the charging connector 5 from being separated from the inlet 1. The locked portion 22 is formed as a recess portion into which a tip portion of the lock shaft 106 protruding outside the plug housing 81 can be inserted.

As illustrated in FIG. 6, a latch 24 made of metal and formed in a U-shape is provided at a shaft contact portion of the locked portion 22 where a tip portion of the lock shaft 106 comes in contact and exerts pressing force. The latch 24 is integrally formed with the housing 21 by insert molding, for example.

The assembled inlet 1 is attached to, for example, a vehicle body of an electric vehicle. Here, an up-down direction of the vehicle body is set as the up-down direction of the inlet 1 when the inlet 1 is attached to the vehicle body, but an attachment direction is not limited thereto.

As illustrated in FIGS. 1 and 3, the charging connector 5 according to the present embodiment includes the mating connection terminal 90 fitted to the connection terminal 70 of the inlet 1, the plug housing 81 including a pair of terminal accommodation chambers 83 and 83 for accommodating the mating connection terminal 90, a solenoid 100 as an actuator provided in the plug housing 81, and the lock shaft 106 (see FIG. 8) that is driven forward and backward by the solenoid 100 to lock the charging connector 5 from being separated from the inlet 1.

The plug housing 81 is molded from electrically insulating synthetic resin.

Figure 4:
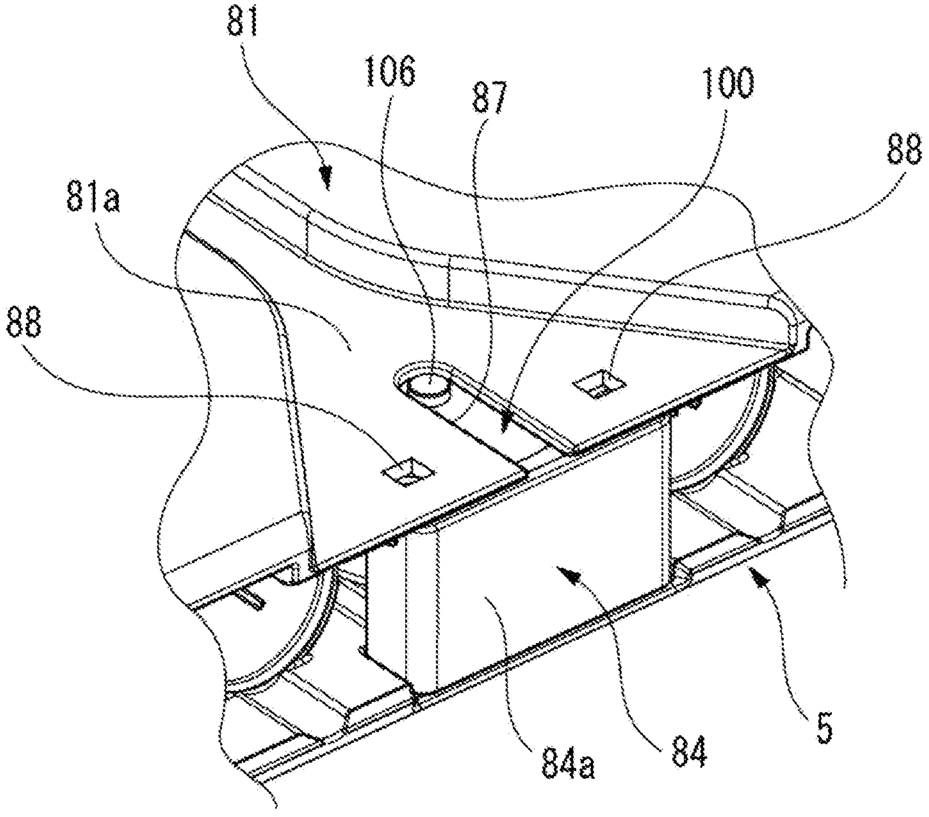
FIG. 4 is an enlarged perspective view of a main part of the charging connector illustrated in FIG. 1.
Figure 5:
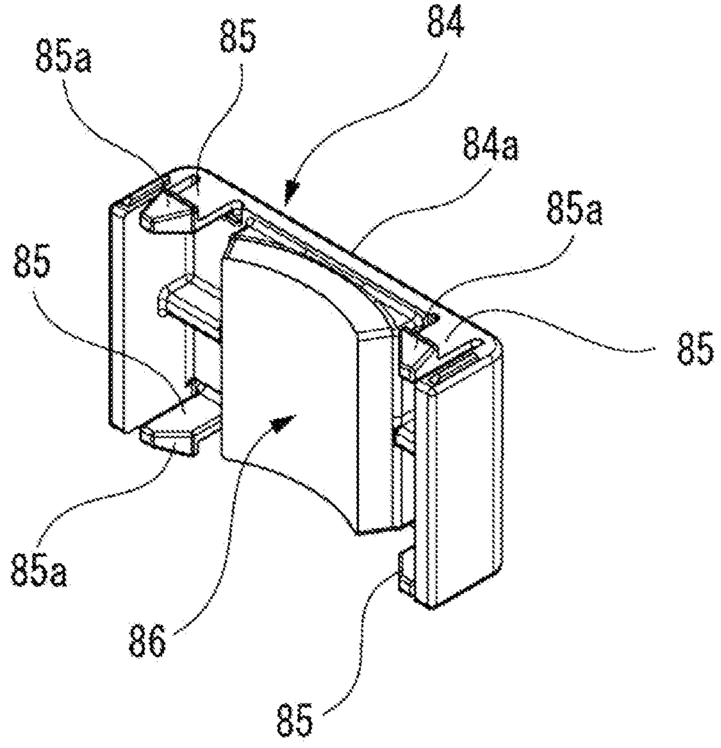
FIG. 5 is a perspective view illustrating inside of a cover member illustrated in FIG. 4.

As illustrated in FIGS. 3 and 4, an actuator accommodation portion 89 for accommodating the solenoid 100 is recessed in a central portion of a front end of the plug housing 81. The actuator accommodation portion 89 holds the solenoid 100 inserted from an open end side at a predetermined position.

A cover member 84 is attached to an open end of the actuator accommodation portion 89. The cover member 84 includes a locking portion 85 that locks the cover member 84 to the plug housing 81 with predetermined locking force. The cover member 84 prevents the solenoid 100 accommodated in the actuator accommodation portion 89 from falling off from the open end.

A notch groove 87 extending rearward from the open end of the actuator housing portion 89 is formed in a central portion of a top wall 81*a* of the plug housing 81. When the solenoid 100 is attached to and detached from the actuator housing portion 89, the notch groove 87 can prevent a tip portion of the lock shaft 106 driven forward and backward by the solenoid 100 from interfering with the plug housing 81 and restricting the movement of the solenoid 100.

The cover member 84 molded from electrically insulating synthetic resin includes a cover body 84*a* having a substantially rectangular flat plate shape, and four locking portions 85 respectively protruding toward a rear side of the plug housing 81 from four corners of an inner surface side of the cover body 84*a*. The locking portions 85 are respectively composed of cantilever-like locking arms including locking protrusions 85*a* at their tips that respectively engage with locking holes 88 formed through the top wall 81*a* and a bottom wall 81*b* of the plug housing 81. A cushion material 86 is provided on an inner surface side of the cover body 84*a* to elastically hold the solenoid 100 accommodated in the actuator accommodation portion 89 and prevent rattling.

As illustrated in FIG. 3, the solenoid 100 as the actuator includes a case 102 made of a magnetic material, a plunger 104 having a disk shape that moves upward when an excitation coil (not illustrated) built in the case 102 is excited, and a lead wire 110 having one end connected to the excitation coil. The plunger 104 is always biased downward to a retracted position by spring resilience. The other end of the lead wire 110 is connected to an electronic control unit (not illustrated), and when the solenoid 100 is energized and excited by a drive signal from the electronic control unit, the plunger 104 is moved upward to an advanced position against backward biasing force.

The lock shaft 106 driven forward and backward by the solenoid 100 has a rear end portion thereof fixed to the plunger 104 having a disk-shape and moves integrally with the plunger 104.

Figure 11:
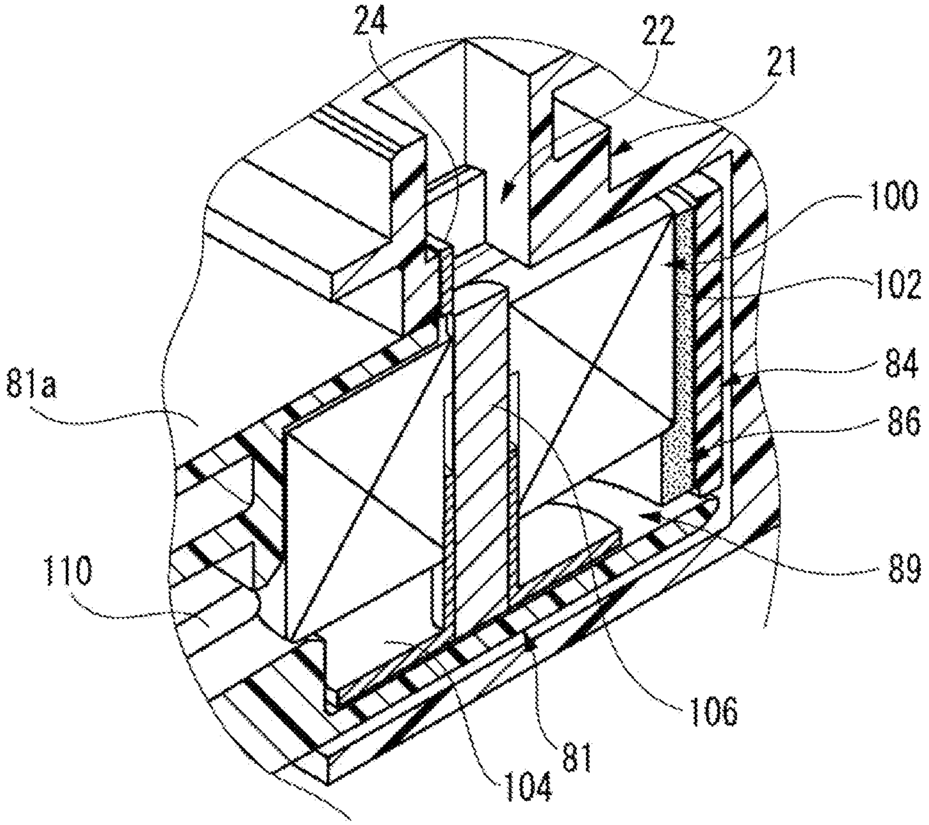
FIG. 11 is a cross-sectional perspective view of a main part illustrating an actuator illustrated in FIG. 10 in a non-excited state.
Figure 12:
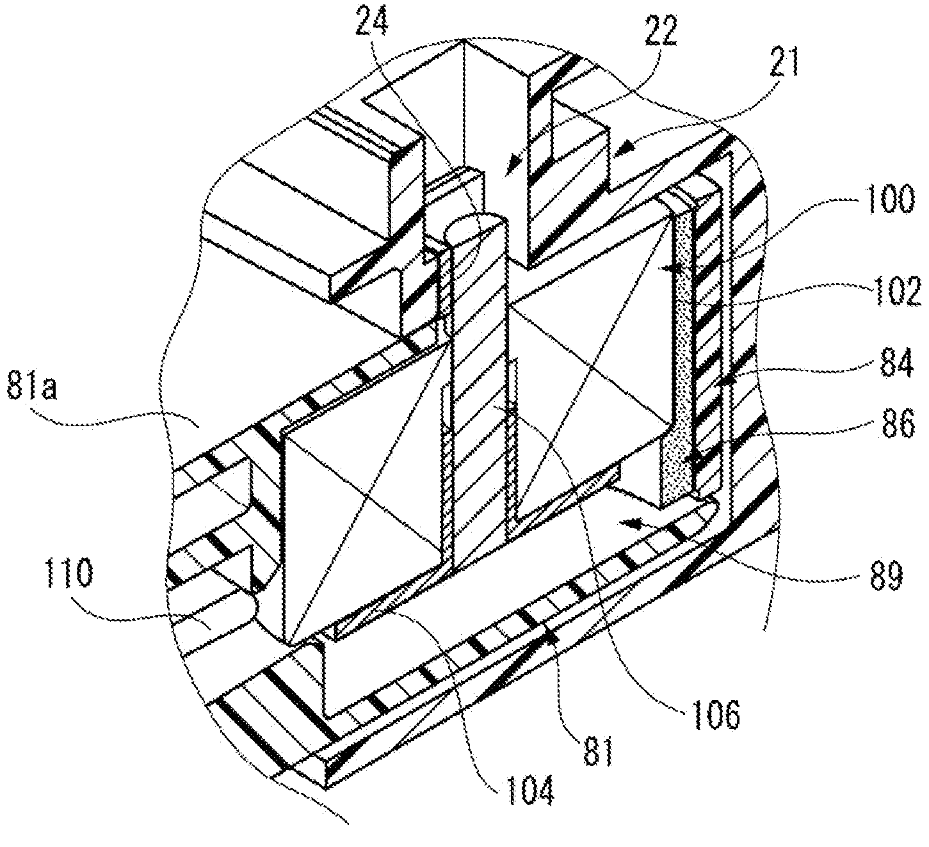
FIG. 12 is a cross-sectional perspective view of a main part illustrating the actuator illustrated in FIG. 10 in an excited state.

Therefore, a tip portion of the lock shaft 106 driven forward and backward by the solenoid 100 is retracted into the plug housing 81 at the retracted position (see FIG. 11), and protrudes out of the plug housing 81 at the advanced position (see FIG. 12).

The plunger itself can also be used as a locking member for the charging connector, for example, by forming a shaft portion integrally with the plunger of the solenoid 100.

With respect to a wire holding portion on the electronic control unit side in the lead wire 110 connected to the solenoid 100, an extra length portion 120 is provided to allow extension of the lead wire 110 when the solenoid 100 is separated from the actuator accommodation portion 89.

Next, an operation of the connector lock device when the inlet 1 and the charging connector 5 according to the present embodiment described above are fitted to each other will be described.

Figure 7:
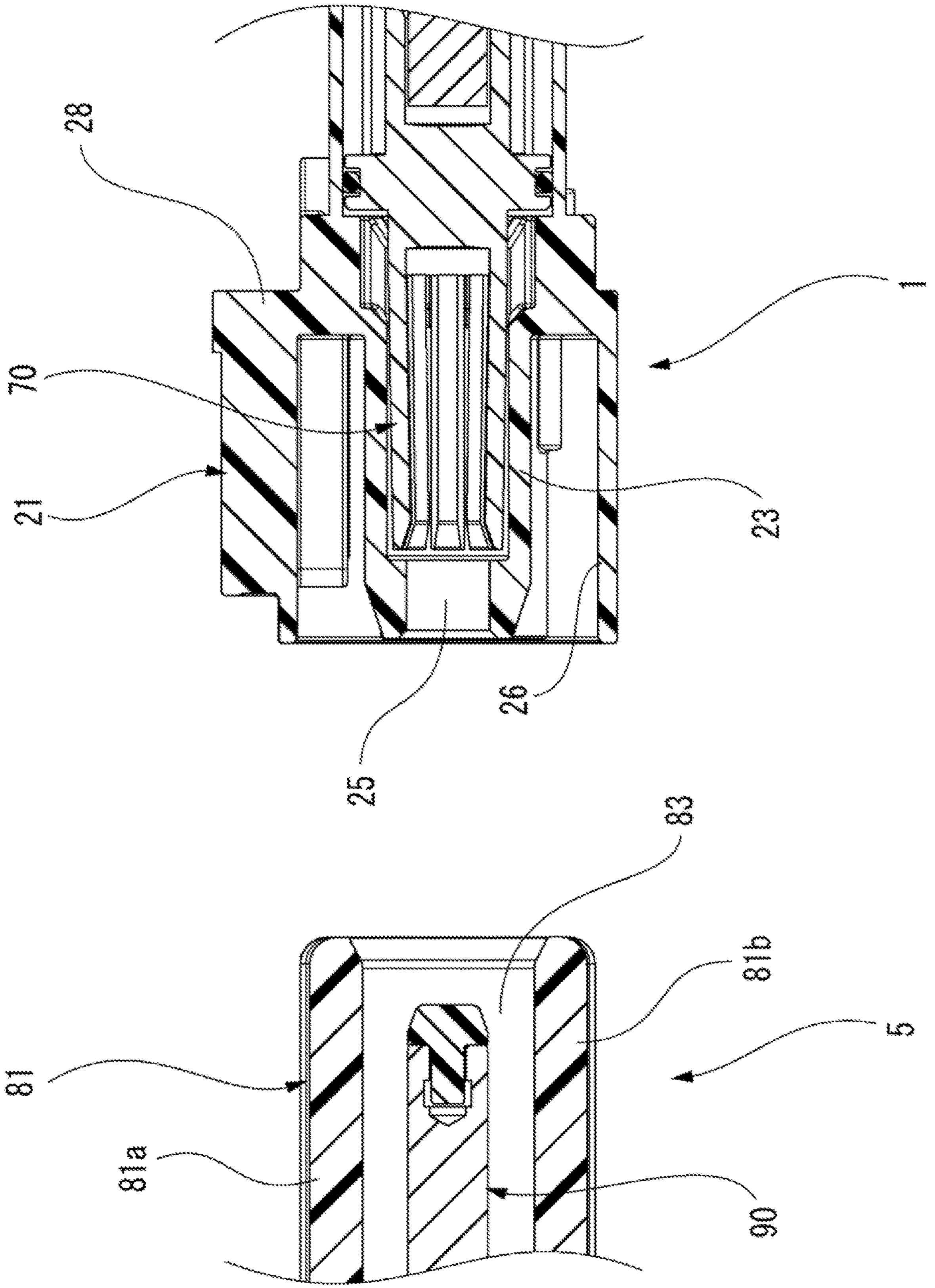
FIG. 7 is a vertical cross-sectional view along an axial line of a mating connection terminal of the charging connector and a connection terminal of the inlet before fitting.
Figure 8:
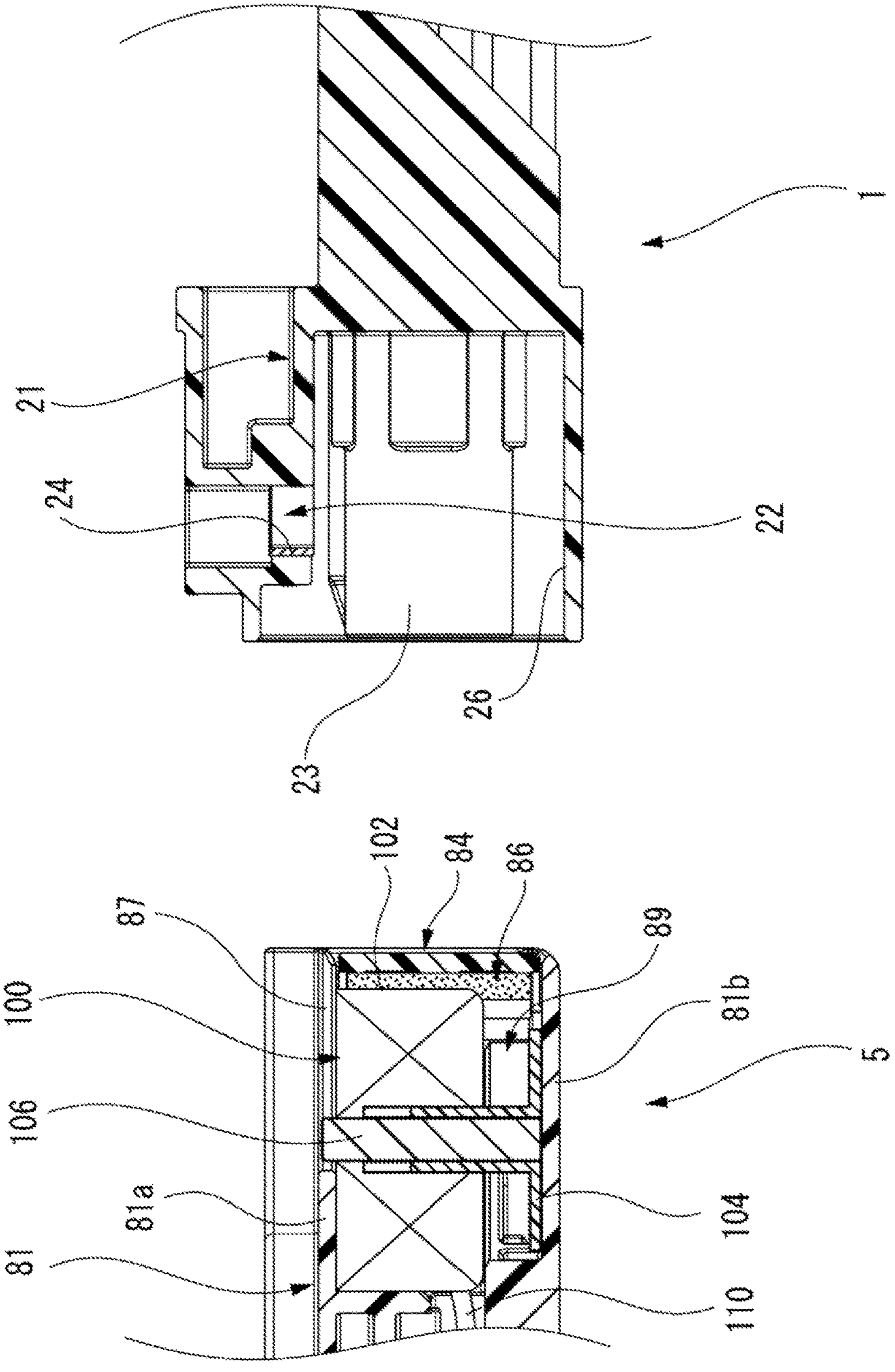
FIG. 8 is a vertical cross-sectional view along a center line of the charging connector and the inlet before fitting.

As illustrated in FIGS. 7 and 8, when the charging connector 5 is fitted to the inlet 1, the plunger 104 of the non-excited solenoid 100 in the charging connector 5 is always biased downward to the retracted position by spring elasticity. Therefore, as illustrated in FIGS. 3 and 8, a tip portion of the lock shaft 106 of which a rear end portion is fixed to the plunger 104 is retracted inside the plug housing 81 and is not exposed outside the plug housing 81. Therefore, the charging connector 5 can be inserted and fitted into the inlet 1.

Figure 9:
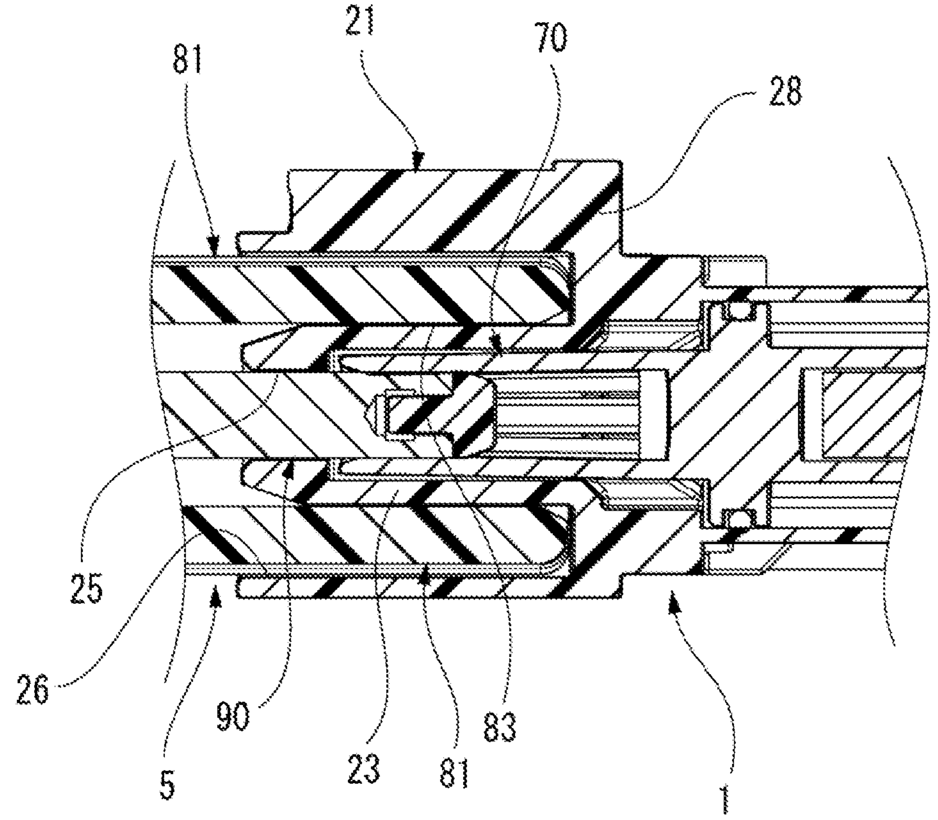
FIG. 9 is a vertical cross-sectional view along the axial line of the mating connection terminal of the charging connector and the connection terminal of the inlet in a fitted state.

Then, when the charging connector 5 is inserted deeply to advance to the rear side of the inlet 1, as illustrated in FIG. 9, the mating connection terminal 90 of the charging connector is fitted and connected to the connection terminal 70 of the inlet 1, whereby the high-voltage cable 71 and a high-voltage cable 91 are electrically connected.

Figure 10:
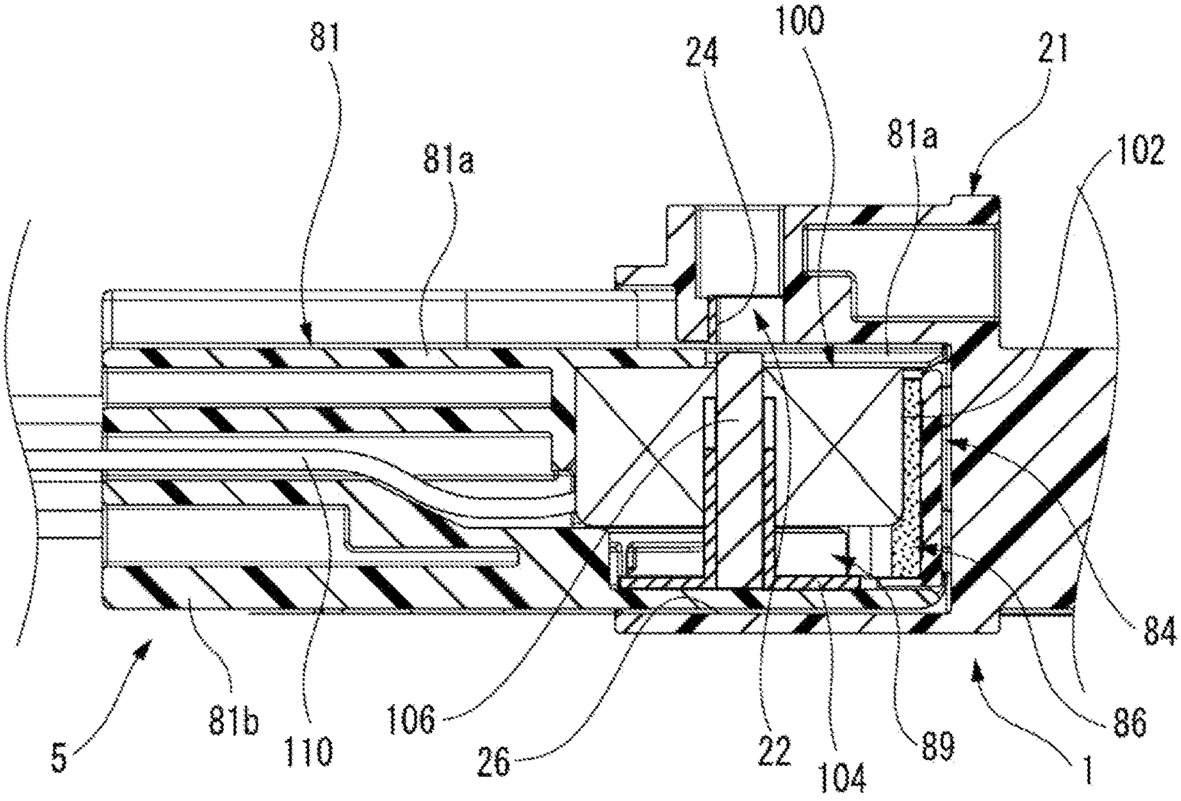
FIG. 10 is a vertical cross-sectional view along the center line of the charging connector and the inlet in the fitted state.

As illustrated in FIGS. 10 and 11, when the charging connector 5 and the inlet 1 are completely fitted to each other, the solenoid 100 provided on the plug housing 81 is positioned opposite the locked portion 22 provided on the housing 21.

Therefore, when the solenoid 100 is energized and excited by a drive signal from the electronic control unit (not illustrated), the plunger 104 is moved upward to the advanced position against the backward biasing force.

Then, as illustrated in FIG. 12, in the lock shaft 106 driven forward and backward by the solenoid 100, the tip portion protrudes out of the plug housing 81, and then is inserted into the locked portion 22 and locked thereto. Therefore, the charging connector 5 and the inlet 1 are maintained in a fitted state and are prevented from being separated from each other.

Therefore, in the charging connector 5 according to the present embodiment described above, the tip portion of the lock shaft 106 for locking the charging connector 5 from being separated from the inlet 1 is at the retracted position at which the tip portion is retracted into the plug housing 81 during non-charging (non-excitation state of the solenoid 100). Therefore, the charging connector 5 can prevent the lock shaft 106 from being damaged by a direct impact when dropped or the like.

The lock shaft 106 that is locked to the locked portion 22 of the inlet 1 to lock the charging connector 5 from being separated from the inlet 1 is driven forward and backward by the solenoid 100. Therefore, it is not necessary to provide a swinging space in the plug housing 81 unlike the case where a swingable locking arm of the related art is provided, and thus a height dimension of the plug housing 81 can be reduced.

When the charging connector 5 is inserted and fitted into the inlet 1, the top wall 81*a* of the plug housing 81 is in sliding contact with the inner surface of the upper wall of the cylindrical-shaped opening portion 26 of the housing 21, but the tip portion of the lock shaft 106 located at the retracted position inside the top wall 81*a* does not come into sliding contact with the housing 21 of the inlet 1 or the like, so there is no risk of wear.

Therefore, according to the charging connector 5 and the inlet 1 according to the present embodiment, the charging connector 5 will not easily come off from the inlet 1 due to damage such as breakage or wear of the lock shaft 106. As a result, a compact connector lock device that can reliably prevent the charging connector 5 from coming off from the inlet 1 can be provided.

Next, an operation of the connector lock device when the charging connector 5 according to the present embodiment described above is forcibly separated from the inlet 1 will be described.

For example, it is possible to consider a case where due to failure of the solenoid 100, the lock shaft 106 cannot be retracted to the retracted position and the charging connector 5 and the inlet 1 in the fitted state cannot be separated. Then, the charging connector 5 must be forcibly pulled out from the inlet 1 to separate the charging connector 5 from the inlet 1.

Here, not only the locked portion 22 of the housing 21 and the lock shaft 106, but also the solenoid 100 itself and the plug housing 81 are overloaded, and there is a possibility that the charging connector 5 and the inlet 1 will be fatally damaged.

In the charging connector 5 of the present embodiment, the cover member 84 attached to the open end of the actuator accommodation portion includes the locking portion 85 that locks the cover member 84 to the plug housing 81 when the charging connector 5 moves in a separation direction with predetermined locking force that does not damage the lock shaft 106 in the advanced position and the locked portion 22.

That is, when force greater than the predetermined locking force acts in the separation direction on the solenoid 100 accommodated in the actuator accommodation portion 89, the locking portion 85 is unlocked before the lock shaft 106 in the advanced position or the locked portion 22 is damaged.

Here, the predetermined locking force of the locking portion 85 is locking force having a magnitude that the locking protrusion 85*a* engaged with the locking hole 88 will not be unlocked by the force acting on the solenoid 100 in the separation direction during normal use, and that the locking protrusion 85*a* engaged with the locking hole 88 will be unlocked when large force in the separation direction that might damage the lock shaft 106 or the locked portion 22 acts on the solenoid 100.

Here, the locking force of the locking portion 85 configured by the cantilever-like locking arm can be set to the predetermined locking force by appropriately changing an engaging margin of the locking protrusion 85*a* with respect to the locking hole 88, a height of the locking protrusion 85*a*, or easiness of bending. That is, the locking portion 85 can be designed more freely.

Figure 13:
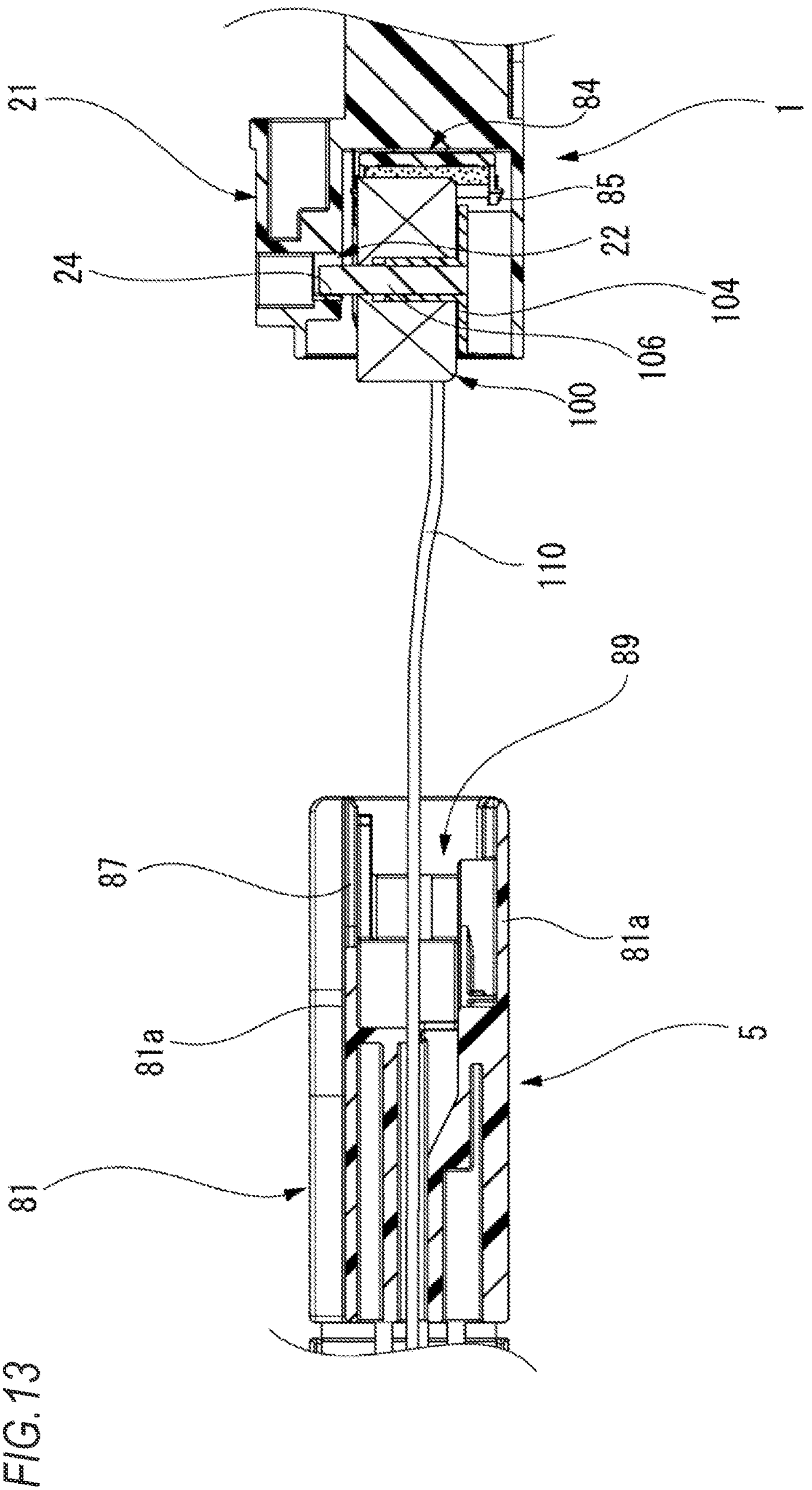
FIG. 13 is a vertical cross-sectional view illustrating an operation when the charging connector with the actuator in the excited state is forcibly separated from the inlet.

Therefore, as illustrated in FIG. 13, when the charging connector 5 in which the lock shaft 106 cannot retract to the retracted position is forcibly pulled out from the inlet 1, the locking portion 85 is unlocked and the cover member 84 is removed from the plug housing 81 before the lock shaft 106 in the advanced position or the locked portion 22 are damaged. Here, the charging connector 5 can move in the separation direction from the inlet 1 while leaving the cover member 84 and the solenoid 100 in the inlet 1.

As a result, when the charging connector 5 of the present embodiment is forcibly pulled out from the inlet 1 to separate the charging connector 5 from the inlet 1, the locked portion 22 of the housing 21 and the lock shaft 106, as well as the solenoid 100 itself and the plug housing 81 will not be subjected to excessive load, and thus the charging connector 5 and the inlet 1 will not be fatally damaged.

The extra length portion 120 is provided with respect to the wire holding portion on the electronic control unit side in the lead wire 110 connected to the solenoid 100. Therefore, when the charging connector 5 is separated from the inlet 1, the lead wire 110 connected to the solenoid 100 is allowed to extend forward from the actuator accommodation portion 89 and is not damaged.

According to the connector lock device of the present embodiment described above, when the charging connector 5, which cannot be separated, is forcibly separated from the inlet 1, the locking portion 85 is unlocked and the cover member 84 is removed from the plug housing 81 before the lock shaft 106 in the advanced position or the locked portion 22 is damaged. Therefore, the charging connector 5 and the inlet 1 can avoid fatal damage.

The present disclosure is not limited to the above-described embodiment, and can be modified, improved, and the like as appropriate. The material, shape, size, number, location, and the like of each component in the above-described embodiment are arbitrary and not limited as long as the present disclosure can be achieved.

For example, in each of the embodiment described above, a charging connector and an inlet used in an electric vehicle or the like are described as an example of a connector lock device, but the connector lock device of the present disclosure is not limited thereto and can be applied to various charging connectors and inlets according to the spirit of the present disclosure.

In the embodiment described above, although the locking portion 85 is configured as a cantilever-shaped locking arm, the locking portion 85 can also be configured as a locking portion of the cover member, for example, by protruding fragile locking protrusions on upper and lower edges of the cover body 84*a* respectively. Here, when large force in the separation direction that might damage the lock shaft 106 or the locked portion 22 acts on the solenoid 100, the fragile locking protrusions that engage with the locking holes 88 with the predetermined locking force are broken and the locking is released. Therefore, only the cover member needs to be replaced without causing fatal damage to the solenoid 100 itself or the plug housing 81.

The actuator of the present disclosure is not limited to the solenoid 100 described above, and a motor unit or the like that is provided with a gear mechanism and an electric motor to drive a locking member forward and backward can also be used.

Here, the features of the embodiment of the connector lock device according to the present disclosure described above are summarized and listed briefly in [1] to [4] below.

[1] A connector lock device including:

a charging connector (5) that supplies power to a battery;

an inlet (1) to which the charging connector (5) is fitted; and a locking member (lock shaft 106) that is driven forward and backward by an actuator (solenoid 100) provided in a housing (plug housing 81) of the charging connector (5), and of which a tip portion is retracted into the housing (plug housing 81) at a retracted position and protrudes out of the housing (plug housing 81) at an advanced position to be locked to a locked portion (22) of the inlet (1) and prevent the charging connector (5) from being separated from the inlet (1).

According to the connector lock device described in [1], the tip portion of the locking member (lock shaft 106) for locking the charging connector (5) to the inlet (1) to prevent separation is at the retracted position at which the tip portion is retracted into the housing (plug housing 81) during non-charging (non-excitation state of solenoid 100). Therefore, the charging connector (5) can prevent the locking member (lock shaft 106) from being damaged by a direct impact when dropped or the like.

The locking member (lock shaft 106) is driven forward and backward by the actuator (solenoid 100). Therefore, it is not necessary to provide a swinging space in the housing (plug housing 81) unlike the case where a swingable locking arm of the related art is provided, and thus a height dimension of the housing (plug housing 81) can be reduced.

When the charging connector (5) is inserted and fitted into the inlet (1), the tip portion of the locking member (lock shaft 106) located at the retracted position inside the housing (plug housing 81) does not come into sliding contact with the inlet (1), so there is no risk of wear.

[2] The connector lock device according to [1], further including:

an actuator accommodation portion (89) that is recessed in a front end of the housing (plug housing 81) for accommodating the actuator (solenoid 100);

a cover member (84) that is attached to an open end of the actuator accommodation portion (89) to prevent the actuator (solenoid 100) from falling off; and a locking portion (85) that is provided on the cover member (84) and that locks the cover member (84) to the housing (plug housing 81) with predetermined locking force that does not damage the locking member (lock shaft 106) at the advanced position and the locked portion (22) when the charging connector (5) moves in a separation direction.

According to the connector lock device described in [2], when the charging connector (5) in which the locking shaft (106) cannot be retracted to the retracted position is forcibly pulled out from the inlet (1) and the charging connector (5) is separated from the inlet (1), the locked portion (22) and the locking member (lock shaft 106), as well as the actuator (solenoid 100) itself and the housing (plug housing 81) will not be subjected to excessive load, and thus the charging connector (5) and the inlet (1) will not be fatally damaged.

[3] The connector lock device according to [2], where the locking portion (85) includes a cantilever-shaped locking arm including a locking protrusion (85*a*) at a tip that engages with a locking hole (88) formed in the housing (plug housing 81).

According to the connector lock device described in [3], the locking force of the locking portion (85) configured by the cantilever-like locking arm can be set to predetermined locking force by appropriately changing an engaging margin of the locking protrusion (85*a*) with respect to the locking hole (88), a height of the locking protrusion (85*a*), or easiness of bending. That is, the locking portion (85) can be designed more freely.

[4] The connector lock device according to [2] or [3], where a lead wire (110) connected to the actuator (solenoid 100) is provided with an extra length portion (120) that allows the lead wire (110) to extend when the actuator (solenoid 100) falls off from the actuator accommodation portion (89).

According to the connector lock device described in [4], when the charging connector (5) is separated from the inlet (1), the lead wire (110) connected to the actuator (solenoid 100) is allowed to extend forward from the actuator accommodation portion (89) and is not damaged.

What is claimed is:

1. A connector lock device comprising:

a charging connector that supplies power to a battery;

an inlet to which the charging connector is fitted;

a locking member that is driven forward and backward by an actuator provided in a housing of the charging connector, and of which a tip portion is retracted into the housing at a retracted position and protrudes out of the housing at an advanced position to be locked to a locked portion of the inlet and prevent the charging connector from being separated from the inlet;

an actuator accommodating portion that is recessed in a front end of the housing and accommodating the actuator; and a notch groove formed in a top wall of the housing that faces the tip portion of the locking member, the notch groove extending rearward from an open end of the actuator accommodating portion, wherein at least a portion of the actuator is inside the inlet if the tip portion is in the advanced position and loc ked to the locked portion.

2. A connector lock device comprising:

a charging connector that supplies power to a battery;

an inlet to which the charging connector is fitted;

a locking member that is driven forward and backward by an actuator provided in a housing of the charging connector, and of which a tip portion is retracted into the housing at a retracted position and protrudes out of the housing at an advanced position to be locked to a locked portion of the inlet and prevent the charging connector from being separated from the inlet;

an actuator accommodation portion that is recessed in a front end of the housing for accommodating the actuator;

a cover member that is attached to an open end of the actuator accommodation portion to prevent the actuator from falling off; and a locking portion that is provided on the cover member and that locks the cover member to the housing with predetermined locking force that does not damage the locking member at the advanced position and the locked portion when the charging connector moves in a separation direction.

3. The connector lock device according to claim 2, wherein the locking portion includes a cantilever-shaped locking arm including a locking protrusion at a tip that engages with a locking hole formed in the housing.

4. The connector lock device according to claim 2, wherein a lead wire connected to the actuator is provided with an extra length portion that allows the lead wire to extend when the actuator falls off from the actuator accommodation portion.

* * * * *